(12) United States Patent
Kubota et al.

(10) Patent No.: US 10,507,634 B2
(45) Date of Patent: *Dec. 17, 2019

(54) APPLICATION DEVICE AND APPLICATION METHOD

(71) Applicant: 3M INNOVATIVE PROPERTIES COMPANY, St. Paul, MN (US)

(72) Inventors: Masayuki Kubota, Hadano (JP); Taishi Tokunaga, Yamato (JP); Takayoshi Fujino, Sagamihara (JP); Katsunori Sakai, Shizuoka (JP); Hiroki Wakamatsu, Hadano (JP)

(73) Assignee: 3M Innovative Properties Compnay, St. Paul, MN (US)

( * ) Notice: Subject to any disclaimer, the term of this patent is extended or adjusted under 35 U.S.C. 154(b) by 645 days.

This patent is subject to a terminal disclaimer.

(21) Appl. No.: 14/975,960

(22) Filed: Dec. 21, 2015

(65) Prior Publication Data

US 2016/0176173 A1 Jun. 23, 2016

Related U.S. Application Data

(63) Continuation-in-part of application No. PCT/US2015/019415, filed on Mar. 9, 2015.

(30) Foreign Application Priority Data

Mar. 14, 2014 (JP) .................................. 2014-052292
Dec. 24, 2014 (JP) .................................. 2014-260415

(51) Int. Cl.
*B32B 37/10* (2006.01)
*B32B 37/00* (2006.01)
(Continued)

(52) U.S. Cl.
CPC .......... *B32B 37/10* (2013.01); *B32B 37/0046* (2013.01); *B32B 37/12* (2013.01);
(Continued)

(58) Field of Classification Search
CPC .............. B29C 43/021; B29C 63/0004; B41M 5/3822; B32B 37/10; B32B 38/1825
See application file for complete search history.

(56) References Cited

U.S. PATENT DOCUMENTS

| 4,150,183 A | 4/1979 | Reed |
| 4,174,994 A | 11/1979 | Savelkouls |

(Continued)

FOREIGN PATENT DOCUMENTS

| CN | 201841729 | 5/2011 |
| CN | 103029409 | 4/2013 |

(Continued)

*Primary Examiner* — Jeffry H Aftergut
*Assistant Examiner* — Jaeyun Lee
(74) *Attorney, Agent, or Firm* — Philip P. Soo

(57) ABSTRACT

An application device that applies an adhesive-backed film to a base material having a bonding surface, along a first direction which is an extending direction of the base material, comprises: an application mechanism having an application unit that applies the film from a first end to a second end in the first direction on the base material by pressing the film; and a film gripping part that grips an end portion of the film on the second end side and can be driven in a second direction that is orthogonal to the first direction and is a direction in which the bonding surface and the film are opposed to each other, wherein the application unit presses the film by moving in the first and second directions relative to the base material.

15 Claims, 10 Drawing Sheets

(51) Int. Cl.
  *B32B 37/12* (2006.01)
  *B32B 37/18* (2006.01)
  *B32B 38/18* (2006.01)
  *B32B 38/00* (2006.01)

(52) U.S. Cl.
  CPC .......... *B32B 37/18* (2013.01); *B32B 38/1825* (2013.01); *B32B 38/1866* (2013.01); *B32B 38/1875* (2013.01); *B32B 2605/00* (2013.01)

(56) References Cited

U.S. PATENT DOCUMENTS

| | | | |
|---|---|---|---|
| 6,863,107 | B2 | 3/2005 | Hein |
| 7,459,051 | B2 | 12/2008 | Habrisreitinger et al. |
| 7,611,600 | B2 * | 11/2009 | Tsujimoto ......... H01L 21/67132 156/249 |
| 7,686,910 | B2 | 3/2010 | Habrisreitinger et al. |
| 7,726,696 | B2 | 6/2010 | Flynn |
| 8,535,035 | B2 * | 9/2013 | Mori ..................... B29C 43/021 425/174.4 |
| 8,784,599 | B2 * | 7/2014 | Sun ................... B41M 5/38221 156/272.8 |
| 2002/0074090 | A1 | 6/2002 | Osumi |
| 2006/0151085 | A1 | 7/2006 | Habrisreitinger |
| 2006/0182951 | A1 | 8/2006 | Morisaki et al. |
| 2009/0096965 | A1 | 4/2009 | Nagata |
| 2014/0338829 | A1 | 11/2014 | Peng |
| 2017/0015090 | A1 * | 1/2017 | Kubota ............... B29C 63/0004 |

FOREIGN PATENT DOCUMENTS

| | | | |
|---|---|---|---|
| CN | 104129144 | | 11/2014 |
| JP | H1-165218 | | 11/1989 |
| JP | H4-30935 | | 3/1992 |
| JP | H06238753 | | 8/1994 |
| JP | 06255063 | A * | 9/1994 ......... B32B 38/1825 |
| JP | H6-255063 | | 9/1994 |
| JP | 6-286928 | | 10/1994 |
| JP | H7-037621 | | 7/1995 |
| JP | 10035612 | A * | 2/1998 |
| JP | H10-35612 | | 2/1998 |
| JP | 2000160115 | A | 6/2000 |
| JP | 2010-054675 | | 3/2010 |
| JP | 2010-224110 | | 10/2010 |
| JP | 2013-95006 | | 5/2013 |
| KR | 101252750 | | 4/2013 |

* cited by examiner

APPLICATION DEVICE AND APPLICATION METHOD

FIELD OF THE INVENTION

One form of the present invention relates to an application device a film to an object and to an application method for applying the film.

BACKGROUND

Conventionally, as described in, for example, Japanese Unexamined Patent Application Publication No. H06-238753A, an adhesive-backed film may be applied to a surface of a predetermined article (e.g., a roof of a vehicle in Japanese Unexamined Patent Application Publication No. H06-238753A). In recent years, there has been a demand to apply such a film to surfaces of wide articles having all kinds of shapes (for example, a roof of a vehicle or the like). The work to apply this type of film is commonly performed manually using squeegee type tools and the like where a rubber plate is mounted on the tip end.

SUMMARY OF THE INVENTION

When the shape of the bonding surface is not flat but is curved or the like, applying an adhesive-backed film by a conventional method can take a long time and there are possibilities that creases or the like may remain in the film after adhering or that traces of the squeegee may remain. Accordingly, there are demands to apply the film onto the bonding surface more quickly and improve the quality of the finish.

An application device according to one aspect of the present invention is an application device that applies an adhesive-backed film to a base material having a bonding surface, along a first direction which is an extending direction of the base material, the application device including: an application mechanism having an application unit that applies the film from a first end to a second end in the first direction on the base material by pressing the film; and a film gripping part that grips an end portion of the film on the second end side and can be driven in a second direction that is orthogonal to the first direction and is a direction in which the bonding surface and the film are opposed to each other; wherein the application unit presses the film by moving in the first and second directions relative to the base material.

The application mechanism can have an application unit that applies from a first end to a second end in a first direction on the base material. Further, the application unit, while gripping the film by the film gripping part, presses the film by moving in the first and second directions relative to the base material. By this, the film can be pressed onto the base material along the first direction by the application unit, and the film is applied to the bonding surface of the base material. In this way, application of the film can be performed quickly using the application mechanism. Further, the film gripping part can be driven in the second direction, which is a direction orthogonal to the first direction and in which the bonding surface and the film are opposed to each other. Therefore, an angle of an unapplied portion of the film can be held within a predetermined range relative to the base material by adjusting the position in the second direction of the film gripping part according to the position of the application unit relative to the base material. By this, wrinkles and the like can be suppressed from occurring in the applied film. According to the above, a film can be applied to a bonding surface quickly, and quality of the finish can be improved.

In an application device according to another aspect of the present invention, the application unit may be split into a plurality of split sections along a third direction that is orthogonal to the first and second directions.

In an application device according to still another aspect, the application mechanism may be able to drive each of a plurality of split sections independently in at least one of the first and second directions.

In an application device according to a further aspect, the application mechanism may have an adjustment mechanism that can adjust the angle of the application unit relative to the base material.

In an application device according to an addition aspect, a tension adjuster may be further provided that can adjust a tension of the film.

In an application device according to another aspect, the tension adjuster may be mounted on the film gripping part.

In an application device according to still another aspect, an extension part may be further provided so as to be continuous with a first end and a second end of the base material.

In an application device according to a further aspect, the application unit may be formed in a curved shape so as to be convex from the first end of the base material to the second end when viewed from the second direction.

In an application device according to an additional aspect, a length in the third direction, which is a direction orthogonal to the first and second directions of the application unit, may be longer than a length in the third direction of the base material.

In an application device according to another aspect, the application unit, while pressing the film, may have a relative movement speed in the first direction relative to the base material that is variable.

An article according to one aspect of the present invention has the film applied using the application device described above.

The article according to another aspect of the present invention may be an application method that applies a film to a base material having a bonding surface, along a first direction which is an extending direction of the base material, including the steps of: applying the film from a first end to a second other end in the first direction on the base material by pressing the film by the application unit; and gripping an end portion of the film on the second end side and moving the end portion on the second end side in a second direction, which is the direction orthogonal to the first direction and in which the bonding surface and the film are opposed to each other, wherein in the step of applying the film to the base material, the film is pressed by moving the application unit in the first and second directions relative to the base material.

According to this aspect, a similar operation and effect can be obtained as that of the application device described above.

According to one aspect of the present invention, a film can be applied to a bonding surface quickly, and quality of the finish can be improved.

DESCRIPTION OF MODES FOR CARRYING OUT THE INVENTION

Exemplary embodiments of the present invention will now be described in detail with reference to the attached drawings. Note that in the descriptions of the drawings, similar or identical components are assigned identical reference numbers and duplicate descriptions thereof are omitted.

First Embodiment

Figure 1:
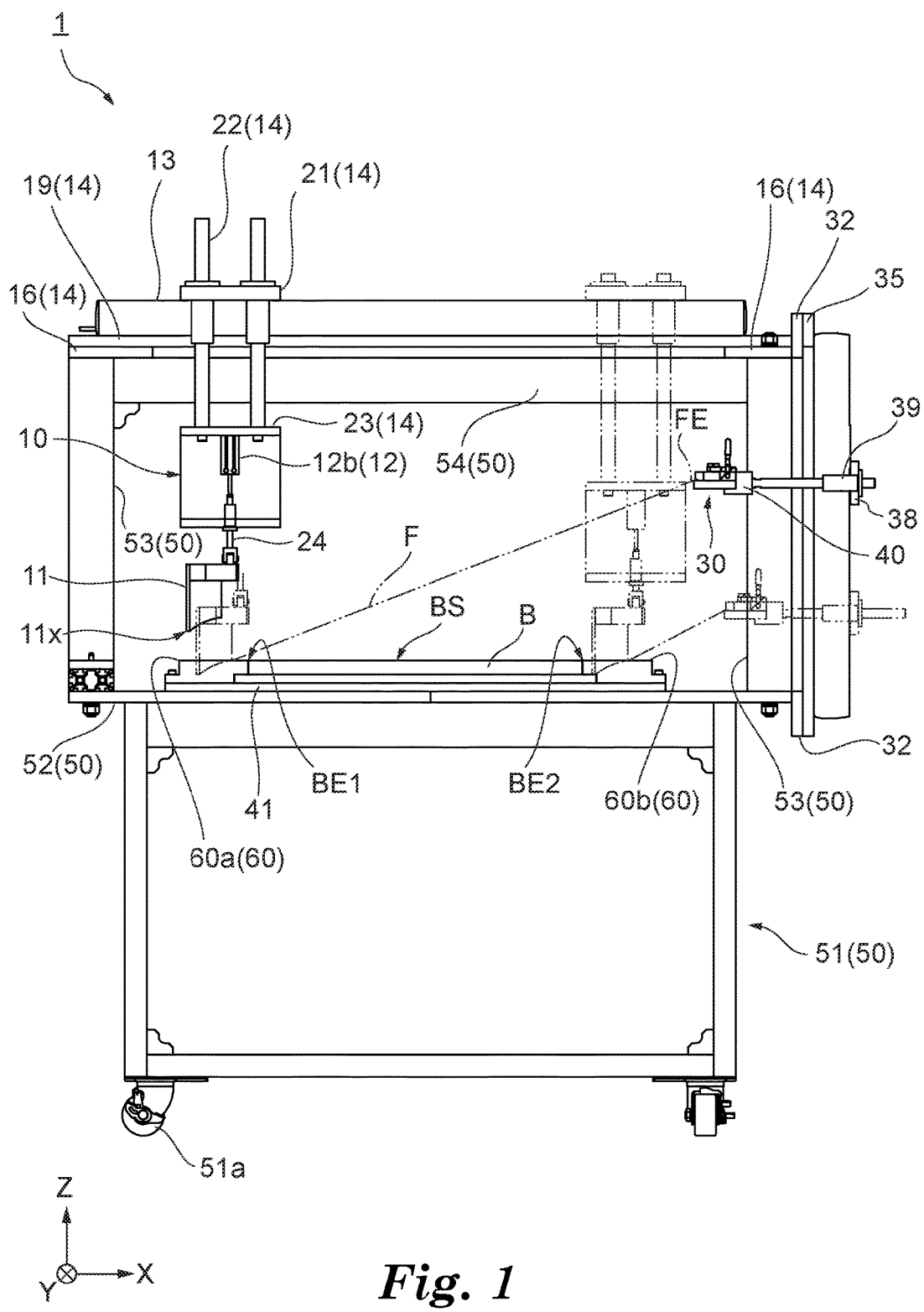
FIG. 1 is a front view of an application device according to a first embodiment.
Figure 2:
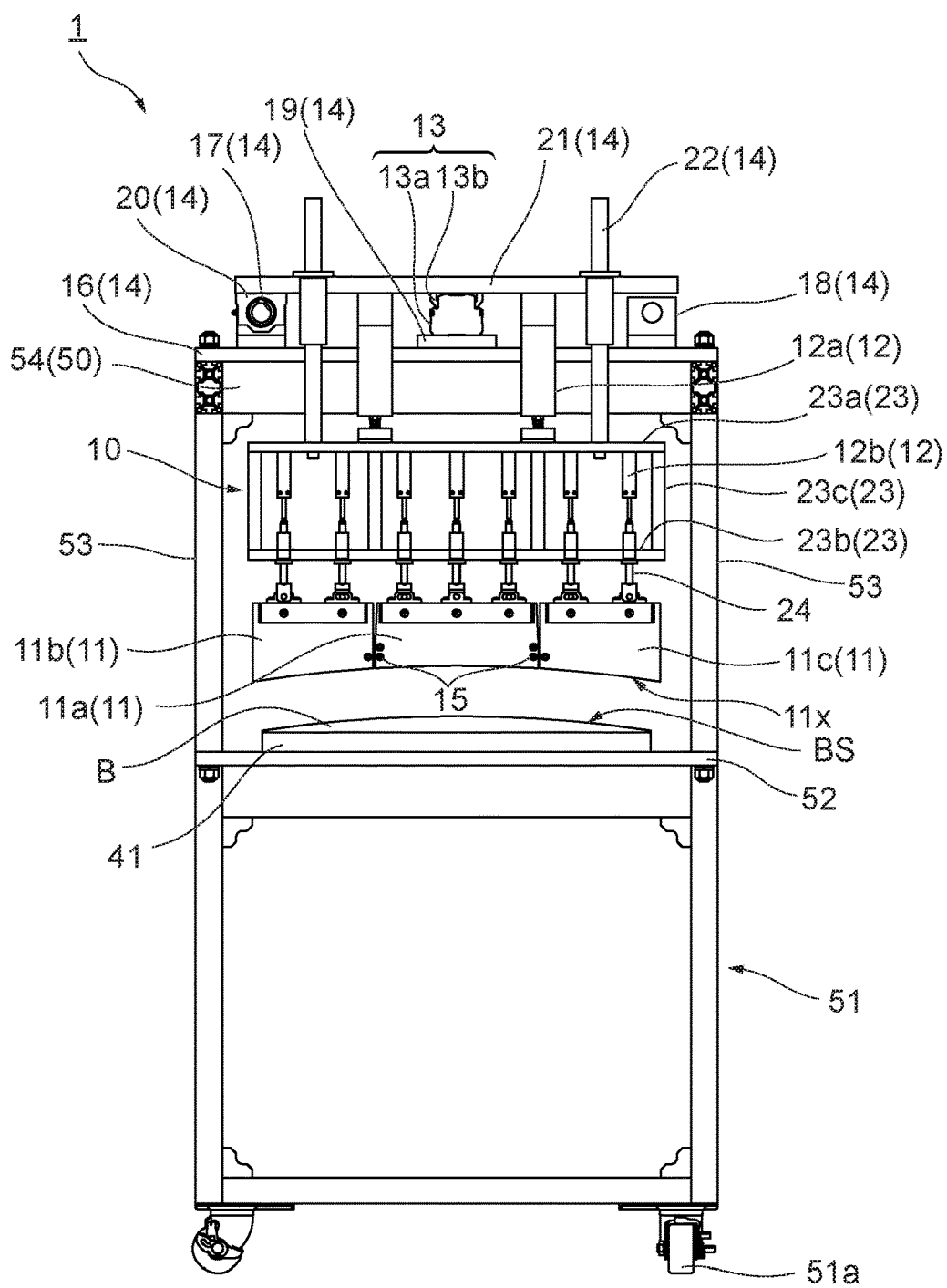
FIG. 2 is a side view of the application device according to the first embodiment.
Figure 3A:
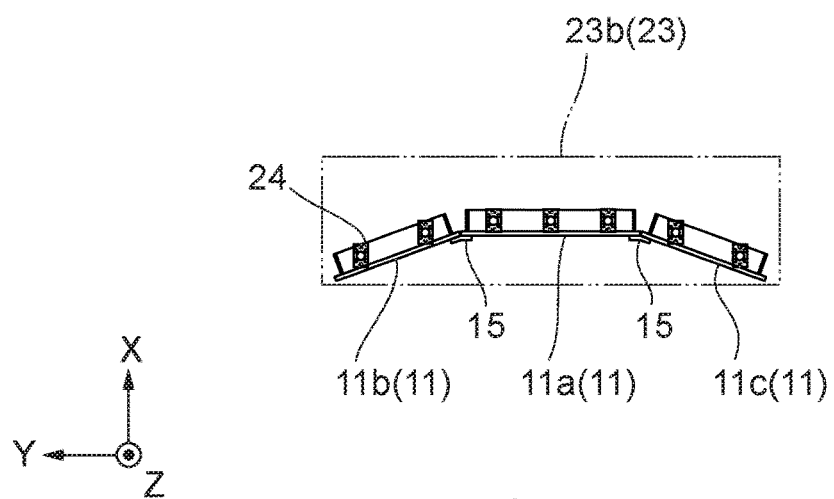
FIGS. 3(a) and 3(b) are plan views of the application device according to the first embodiment.
Figure 3B:
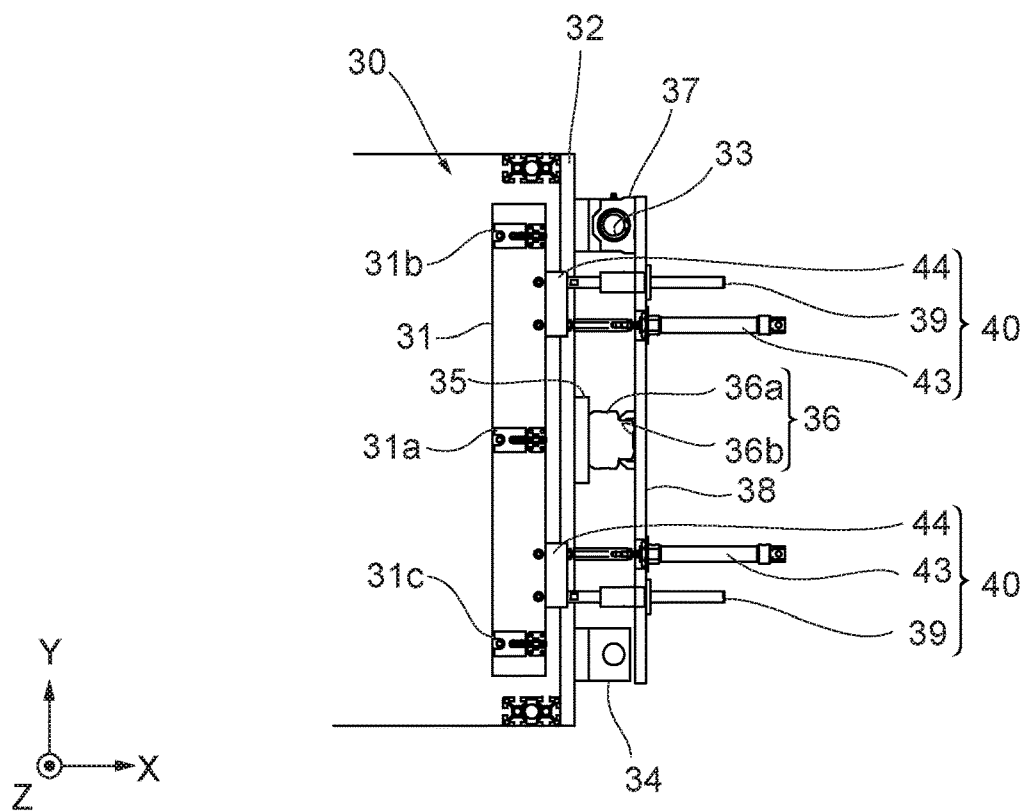

A configuration of an application device 1 according to a first embodiment will be described with reference to FIGS. 1 to 3. The application device 1 is an application device that applies an adhesive-backed film F onto a base material B having a bonding surface BS. The base material B having the bonding surface BS is not particularly limited as long as it is a base material having a surface to which the film F is applied and is, for example, a roof panel portion of a vehicle. In addition, all types of articles such as aircraft, watercraft, construction, and the like may also be employed as target objects for applying the film F. Note that the base material B utilized in this embodiment has the bonding surface BS that is curved so as to be convex upward and has a horizontal cross-sectional shape that is constant in the length direction (see FIG. 5C). The film F is not particularly limited as long as it has a thin film shape and is molded in a thin film shape having a polymer component such as a synthetic resin and the like.

First, a frame structure 50 of the application device 1 will be described. As illustrated in FIG. 1 to FIG. 3, an application device 1 includes, as the frame structure 50, a base portion 51, a rectangular flat portion 52 provided substantially level on an upper end of the base portion 51, four column portions 53 that extend upward from the four corners of the flat portion 52, and four beam portions 54 spanning between upper ends of adjacent column portions 53. Each configuration of the frame structure 50 is configured of, for example, an aluminum frame. The base portion 51 is configured to be movable by casters 51a. A rectangular table 41 is provided on the flat portion 52 to place the base material B. The flat portion 52 and the table 41 are identical in the long direction and the short direction. Hereinafter, the following description may refer to the long direction as an X-axis direction and the short direction as a Y-axis direction of the flat portion 52 and the table 41. Further, a direction in which the column portions 53 extend, which is orthogonal to the X-axis direction and the Y-axis direction, may be referred to as a Z-axis direction.

The application device 1 is provided with an application mechanism 10 that applies the film F to the base material B by pressing the film F, a film gripping part 30 that grips the film F, and a tension adjuster 40 that can adjust the tension of the film F. The application mechanism 10 and the film gripping part 30 are integrated into the frame structure 50 described above. Note that, in FIG. 1, a portion of the members disposed on the paper surface front side (such as a shaft 17 and the like described below) are omitted for clarification and illustrating details of the application mechanism 10 and the film gripping part 30.

The application mechanism 10 has an application unit 11 that presses the film F to apply the film F on the base material B from a first end BE1 in a first direction to a second end BE2. The first direction is an extending direction of the base material B when the base material B is placed on the table 41 and is the X-axis direction described above. The following description presupposes that the base material B is placed on the table 41.

The application mechanism 10 includes the application unit 11 described above, a positioning mechanism 12 that determines the pressing position of the film F by the application unit 11 in the second direction, a drive mechanism 13 that drives the application unit 11 in the X-axis direction, and a support mechanism 14 that supports the application unit 11. The second direction is a direction that is orthogonal to the X-axis direction and in which the bonding surface BS and the film F are opposed to each other, and is the Z-axis direction described above. The application mechanism 10 presses the film F by moving relatively in the X-axis direction and the Z-axis direction on the base material B. Specifically, the positioning mechanism 12 drives the application unit 11 in the Z-axis direction while the drive mechanism 13 drives the application unit 11 in the X-axis direction, and thereby, the film F is pressed on the base material B by the application unit 11.

The application unit 11 presses the film F to apply the film F to the bonding surface BS of the base material B. The pressing of the film F refers to the application unit 11 pressing the film F onto the bonding surface BS while the film F is sandwiched between the application unit 11 and the bonding surface BS. The application unit 11 is supported above the film F and the base material B by the support mechanism 14 (details to be described below), and presses the film F from above the film F and the base material B. The application unit 11 has a tip end 11X formed in a squeegee shape and presses the film F by the tip end 11X. For example, a rubber blade (not illustrated) is provided as a cushioning material to the tip end 11X. The shape of the tip end 11X of the application unit 11 is not limited to a squeegee type, but may also be, for example, a roller type. With the application unit 11, the length in the third direction, which is a direction orthogonal to the X-axis direction and the Z-axis direction, is longer than the length in the third direction of the base material B. The third direction is the width direction of the base material B and the application unit 11 and is the Y-axis direction described above. That is to say, the length in the width direction of the application unit 11 is longer than the length in the width direction of the base material B.

The application unit 11 is split into a plurality of split sections 11a, 11b, and 11c along the Y-axis direction. With the application unit 11, the split sections 11b and 11c are disposed on both sides of the split section 11a, and the split section 11a and the split section 11b, and the split section 11a and the split section 11c are coupled by couplers (connecting fittings) 15, respectively. In this embodiment, the base material B (bonding surface BS) is in a curved shape so as to be convex in the Z-axis direction (and upward) approaching the center portion of the base material B in the Y-axis direction when viewed from the X-axis direction. With the application unit 11, the tip end 11X is shaped according to the curved shape of the base material B (bonding surface BS). In other words, the application unit 11 is formed into a concave shape in the Z-axis direction (and upward) approaching the center portion of the tip end 11X in the Y-axis direction when viewed from the X-axis direction. Further, the application unit 11 is formed in a curved shape so as to be convex from a first end BE1 to a second end BE2 of the base material B when viewed from the Z-axis direction. The coupler 15 is a movable coupler, and is a coupler that pivots according to positions of the split sections 11a, 11b, and 11c and the guide shaft 24. Further, the coupler 15 may function so as to adjust the relative positions of the split sections 11a, 11b, and 11c so that excessive gaps do not occur between the split sections 11a, 11b, and 11c. For example, when the bonding surface BS of the base material B is greatly curved, creating a large amount of protrusion in the center portion in the Y-axis direction, the split sections 11b and 11c are squeezed inward and the split sections 11b and 11c are coupled to the split section 11a by the coupler 15. The split sections 11a, 11b, and 11c can each be driven in the Z-axis direction independently by the driving force of the drive unit 12b. Note that by adding the drive unit, each of the split sections 11a, 11b, and 11c may be driven in the X-axis direction, independently. By this, the curved shape of the application unit 11 can be adjusted to match the base material B when viewed from the Z-axis direction. At this time, the mutual coupling angles of the couplers 15 for the split sections 11a, 11b, and 11c when viewed from the Z-axis direction can be changed. Note that the coupler 15 may not necessarily be provided. In other words, the split sections 11a, 11b, and 11c may not be mutually coupled.

The support mechanism 14 is a mechanism for supporting the application unit 11 from above the base material B. Further, support mechanism 14 functions as a guide mechanism to guide the drive in the X-axis direction of the application unit 11. The support mechanism 14 includes: a pair of attachment plates 16 provided so as to span between a pair of beam portions 54 on both ends of the pair of beam portions 54 that extend in the X-axis direction; a pair of shafts 17 that extend in the X-axis direction provided so as to span between the pair of attachment plates 16 (note that, in FIG. 2, only the shaft 17 in the Y-axis positive side is illustrated of the pair of shafts 17); a shaft holder 18 to secure both ends of each of the pair of shafts 17 to the attachment plates 16 (note that, in FIG. 2, only the shaft holder 18 in the Y-axis negative side is illustrated of the shaft holders 18); a drive mechanism attachment plate 19 fixed to the pair of attachment plates 16 and extending in the X-axis direction between the pair of shafts 17; a pair of linear bearings (linear bushings) 20 provided respectively for the pair of shafts 17; a slide plate 21 fixed to a slider 13b (details described below) provided on the drive mechanism attachment plate 19 and the upper surface of the pair of linear bearings 20; a guide shaft 22 fixed to the slider plate 21 so as to pass through the slider plate 21 in the Z-axis direction; and a support box 23 fixed to the bottom end of the guide shaft 22.

The box 23 is configured to include an upper wall 23a and a lower wall 23b provided substantially horizontal and opposing in the Z-axis direction, and a coupling wall 23c provided substantially vertical to connect the upper wall 23a and the lower wall 23b. A drive unit 12a (details described below) of the positioning mechanism 12 that gives a thrust in the Z-axis direction downward is fixed to the upper surface of the upper wall 23a. The guide shaft 22 can expand and contract in the Z-axis direction in conjunction with the drive unit 12a driving the upper wall 23a in the Z-axis direction downward. Further, a drive unit 12b (details described below) that gives a thrust in the Z-axis direction downward is fixed to the bottom surface of the upper wall 23a, the guide shaft 24 is fixed to the bottom end of the drive unit 12b, and the application unit 11 is fixed to the bottom end of the guide shaft 24. The shaft 17 is, for example, a cylindrical shaft shaped member made of aluminum. The linear bearing 20 is a guide member used in combination with the shaft 17 for linear movement in the X-axis direction with little friction resistance around the shaft 17 in conjunction with the drive of the slider 13b. The linear bearing 20 guides the drive in the X-axis direction of the slide plate 21 fixed to the slider 13b.

The positioning mechanism 12 determines the pressing position in the Z-axis direction of the film F by the application unit 11. The positioning mechanism 12 is configured of the drive units 12a and 12b. Air cylinders are employed as the drive units 12a and 12b, and the air cylinders drive the application unit 11 in the Z-axis downward using pneumatic pressure. The pneumatic pressure applied to the drive units 12a and 12b is predetermined according to the shape of the base material B. The upper end of the drive unit 12a is fixed to the slide plate 21 while the lower end is fixed to the upper surface of the upper wall 23a. The drive unit 12a drives the box 23 in the Z-axis downward by the pneumatic pressure to drive the application unit 11 in the Z-axis downward via the drive unit 12b and the guide shaft 24. In other words, the drive unit 12a determines the pressing position generally in the Z-axis direction of the application unit 11 by driving the box 23 in the Z-axis downward. Two drive units 12a are provided, for example, in line in the Y-axis direction.

The drive unit 12b drives the guide shaft 24 in the Z-axis downward, by the pneumatic pressure, to drive the application unit 11, fixed to the bottom end of the guide shaft 24, in the Z-axis downward. Seven drive units 12b are provided, for example, in line in the Y-axis direction. Three of the drive units 12b positioned in the center of the Y-axis direction are fixed to the split section 11a of the application unit 11 via the guide shaft 24. Further, two of the drive units 12b positioned on the first end side in the Y-axis direction are fixed to the split section 11b via the guide shaft 24, and two of the drive units 12b positioned on the second end side in the Y-axis direction are fixed to the split section 11c via the guide shaft 24. Therefore, the drive unit 12b can respectively drive the split sections 11a, 11b, and 11c independently in the Z-axis downward, but each of the drive units 12b may drive the split sections 11a, 11b, and 11c in the Z-axis downward by the same thrust, respectively. When the drive unit 12b drives each of the split sections 11a, 11b, and 11c independently in the Z-axis downward, the couplers 15 may not be provided, and actuators may be internally installed in the couplers 15 themselves so as not to interfere in the independent operations of the split sections 11a, 11b, and 11c. After the general pressing position is determined in the Z-axis direction of the application unit 11 by the drive unit 12a, the drive unit 12b determines the specific pressing position in the Z-axis direction of the application unit 11 by driving each of the split sections 11a, 11b, and 11c in the Z-axis downward. The position in the Z-axis direction of the application unit 11 after positioning by the drive unit 12b is a position in which the film F can be pressed onto the bonding surface BS of the base material B.

The drive mechanism 13 drives the application unit 11 in the X-axis direction supported by the support mechanism 14 by driving the slide plate 21, which is the support mechanism 14, in the X-axis direction. The drive mechanism 13 is configured by a drive mechanism that employs, for example, a single axis robot. Hereinafter, the drive mechanism 13 is described as a single axis robot. The drive mechanism 13 includes a base portion 13a extending in the X-axis direction and fixed to the drive mechanism attachment plate 19 and a slider 13b that is driven within the base portion 13a in the X-axis direction by a motor. The slider 13b fixes the slide plate 21 on the top surface thereof. The drive mechanism 13 is controlled by a dedicated controller (not illustrated). The drive speed and the drive distance of the slider 13, for example, when driving the slider 13b, is preset in the controller. Note that the movement speed (drive speed) preset in the controller is variable for when the application unit 11 is pressing the film F.

Here, an extension part 60 may be provided to a table 41 in addition to the base material B. The extension part 60 has a first extension part 60a provided so as to be continuous with the first end BE1 of the base material B in the X-axis direction and a second extension part 60b provided so as to be continuous with the second end BE2 of the base material B. The upper surfaces of the first extension part 60a and the second extension part 60b are flush with the bonding surface BS of the base material B. The drive mechanism 13, when driving the application unit 11 in the X-axis direction, makes the starting point of the drive to be where the first extension part 60a is provided and the ending point of the drive to be where the second extension part 60b is provided. Note that, although not illustrated in FIGS. 1 to 3, the end part of the film F on the opposite side to the side gripped by the film gripping part 30 is gripped in a position where the position in the Z-axis direction is substantially matching with the bonding surface BS of the base material B on the outer side in the X-axis direction (opposite side to the side where the base material B is provided in the X-axis direction) than the first extension part 60a.

The film gripping part 30 grips the end part FE of the film F of the second side BE2 side in the X-axis direction and is driven in the Z-axis direction. The film gripping part 30 includes: a gripping plate 31 that extends in the Y-axis direction on which gripping members 31a, 31b, and 31c are provided that grip the end part FE; a pair of attachment plates 32 that span between the upper ends and lower ends of the adjacent column portions 53 on the second end BE2 side in the X-axis direction; a pair of shafts 33 extending in the Z-axis direction provided so as to span between the pair of attachment plates 32 (in FIG. 3B, only the shaft 33 on the Y-axis positive side is illustrated); a shaft holder 34 that fixes both ends of each of the pair of shafts 33 is fixed to the attachment plate 32 (in FIG. 3B, only the shaft holder 34 on the Y-axis negative side is illustrated); a drive mechanism attachment plate 35 fixed to the pair of attachment plates 32 and extending in the Z-axis direction between the pair of shafts 33; a drive mechanism 36 extending in the Z-axis direction fixed to the drive mechanism attachment plate 35; a pair of linear bearings (linear bushings) 37 provided respectively for the pair of shafts 33; and a slide plate 38 fixed to a slider 36b of the drive mechanism 36 and the pair of linear bearings 37. The gripping member 31a is provided in a center portion of the Y-axis direction on the gripping plate 31, and the gripping members 31b and 31c are provided at both end portions in the Y-axis direction of the gripping plate 31.

Figure 4:
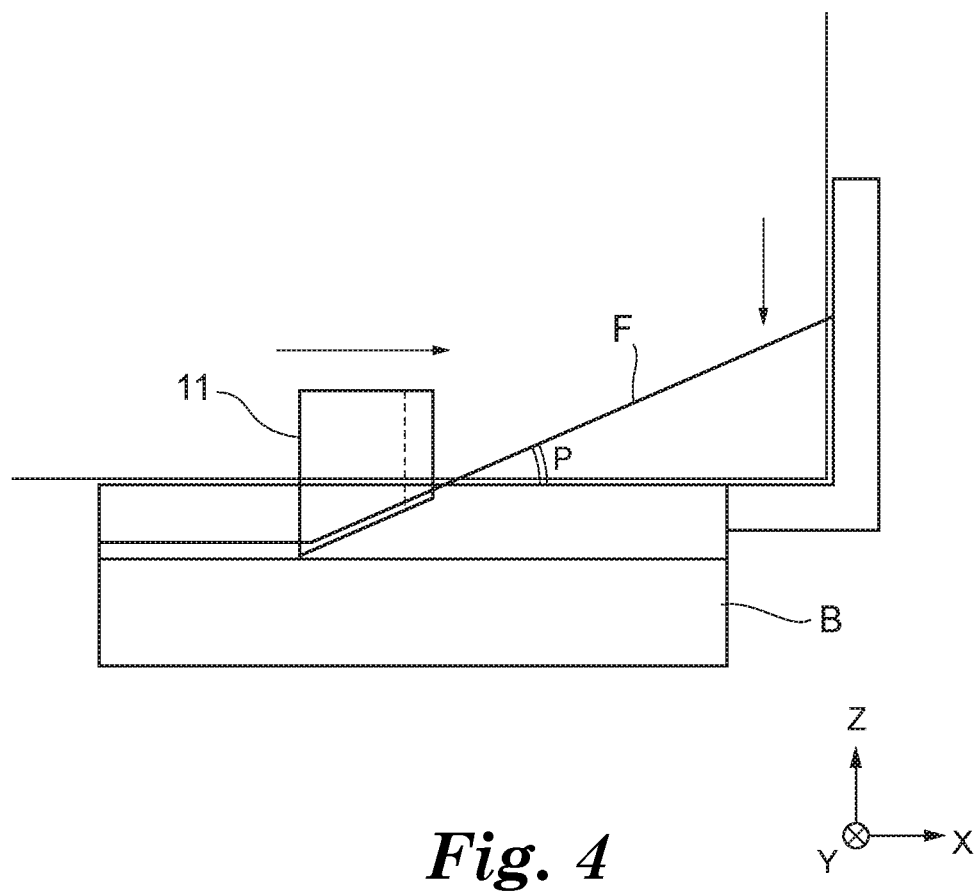
FIG. 4 is a diagram schematically illustrating coupling of an application mechanism and a film gripping part.

The drive mechanism 36, similar to the drive mechanism 13 described above, is configured by a drive mechanism that employs, for example, a single axis robot. The drive mechanism 36 includes a base portion 36a extending in the Z-axis direction and fixed to the drive mechanism attachment plate 35 and a slider 36b that is driven by a motor within the base portion 36a in the Z-axis direction. The slider 36b is fixed to the gripping plate 31 via the slide plate 38, the guide shaft 39, and a coupling plate 44. Therefore, the gripping plate 31 is driven in the Z-axis direction in conjunction with the drive in the Z-axis direction of the slider 36b. The drive mechanism 36 is controlled by a dedicated controller (not illustrated). The drive speed and the drive distance of the slider 36, for example, when driving the slider 36b, is preset in the controller. The drive speed and the drive distance in the Z-axis direction of the slider 36b are determined according to the drive speed and the drive distance in the X-axis direction of the slider 13b set in the controller of the drive mechanism 13. As illustrated in FIG. 4, in this embodiment, the angle formed by the X-axis direction (extending direction of the bonding surface BS) and the film F prior to pressing is always a substantially constant angle (angle P) while pressing the film F by the application unit 11. Therefore, the drive speed and the drive distance of the slider 36b must be a value that corresponds to the drive speed and the drive distance of the slider 13b. The drive speed and the drive distance of the sliders 13b and 36b may be set to values pre-associated in the controllers of the drive mechanism 13 and 36. Further, both of the drive speeds and the drive distances may be adjusted by, for example, sending and receiving information signals between the controllers of the drive mechanisms 13 and 36 concerning real time position, speed, pressing force on the film, and the like, during pressing by the application unit 11.

A tension adjuster 40 is mounted on the film gripping part 30. Specifically, the tension adjuster 40 is provided with a drive unit 43 that drives the gripping members 31a, 31b, and 31c in the X-axis direction, a guide shaft 39 fixed to the slide plate 38 and that passes through the slide plate 38 in the X-axis direction, and a coupling plate 44 that connects the gripping plate 31 and the guide shaft 39. For example, an air cylinder may be employed as the drive unit 43, and the tension may be adjusted by controlling the pneumatic pressure. The tension adjuster 40 may drive the gripping members 31a, 31b, and 31c in the X-axis direction via the gripping plate 31. Note that the tension adjuster may have a configuration in which a roll shaped rolling device is provided to adjust the payout length of the film instead of using a drive unit such as an air cylinder.

Next, an application method of the film F using the application device 1 according to this embodiment will be described.

In the preparation steps prior to operating the application device 1, the base material B is set on the table 41, the first end portion FE of the film is gripped by the gripping members 31a, 31b, and 31c of the film gripping part 30, and the second end portion of the film F is gripped by a furnished gripping member (not illustrated). Further, an appropriate tension is applied to the film F during film application by the tension adjuster 40. Additionally, the application mechanism 10 is set so that a position in the X-axis direction of the application unit 11 is in a position where the first extension art 60a, which is the starting point of the drive of the application unit 11, is provided.

Once preparation is complete, first, an operator's instruction (for example, pressing a start button or the like to initiate drive in the Z-axis direction) triggers the drive unit 12a to drive the application unit 11 in the Z-axis downward by pneumatic pressure. By this, a general pressing position is determined in the Z-axis direction of the application unit 11. Subsequently, the drive unit 12b drives the application unit 11 in the Z-axis downward by the pneumatic pressure. By this, the specific pressing position is determined in the Z-axis direction of the application unit 11. The position in the Z-axis direction of the application unit 11 after positioning by the drive unit 12b is a position in which the application unit 11 can press the film F onto the base material B. Because the position in the X-axis direction of the application unit 11 is a position where the first extension part 60 is provided, the application unit 11 presses the film F to the first extension part 60a when initiating pressing (see the application unit 11 indicated by the imaginary line in FIG. 1).

Next, an operator's instruction (for example, pressing a start button or the like to initiate operation in the X-axis direction) triggers the slider 13b of the drive mechanism 13 to drive in a direction from the first end BE1 to the second end BE2 of the base material B, i.e., the X-axis direction. By this, the application unit 11 applies the film F onto the base material B while driving in a direction from the first end BE1 to the second end BE2 of the base material B. At the time that the slider 13b is driven in the X-axis direction, the slider 36b of the film gripping part 30 is driven in the Z-axis direction downward corresponding to the drive in the X-axis direction of the slider 13b. By this, the gripping members 31a, 31b, and 31c of the film gripping part 3 are driven in the Z-axis direction downward. While the application unit 11 is pressing the film F, the drive speed and the like of the sliders 13b and 36b is adjusted so that the angle formed by the X-axis direction (extending direction of the bonding surface BS) and the film F prior to pressing is always a substantially constant angle (angle P). In other words, either the drive speed of the sliders 13b and 36b are associated and set in advance in the controllers of the drive mechanisms 13 and 36, or signals are sent and received in real time between the controllers of the drive mechanisms 13 and 36 during pressing by the application unit 11, to adjust drive speeds and the like for both of the drive mechanisms 13 and 36. Further, while the application unit 11 is pressing the film F, tension of the film F is adjusted by the drive unit 43 of the tension adjuster 40 driving the gripping members 31a, 31b, and 31c in the X-axis direction.

When the position in the X direction of the application unit 11 is a position where the second extension part 60b, which is the ending point of the drive of the application unit 11, is provided, the drive in the X-axis direction of the slider 13b terminates and the application unit 11 stops. After stopping, the application unit 11 is returned to a position in the Z-axis direction of prior to the start by the drive units 12a and 12b and is returned to a position in the X-axis direction of prior to the start by the slider 13b (a position where the first extension part 60a is provided).

Next, a portion of the polyethylene terephthalate (PET) of the film F is torn off. The film F is a two layer structure configured of, for example, a PET portion and a main body portion. The main body portion of the film F has a cut between the portion to be applied to the base material B and the portion to be applied to the second extension part 60b. Therefore, of the main body portion of the film F, the portion applied to the base material B and the portion applied to the second extension part 60b can be easily cut away.

After the PET portion of the film F has been peeled, the portion of the main body portion applied to the second extension part 60b is cut away to complete the application work of the film F onto the base material B. The above are steps according to an application method of the film F using the application device 1. Note that, the base material B after the completion of the application work of the film F corresponds to the "article having a film applied by using the application device" set forth in the claims.

Next, an operation and effect of the application device 1 according to this embodiment will be described.

For example, work to apply a film onto a base material having a wide width such as a roof of the vehicle is commonly performed manually using a squeegee type tool and the like that mounts a rubber blade on the tip end. However, this manual operation requires a lot of time because it is performed by a plurality of people. Further, when performing the work manually, wrinkles may occur in the film, making it difficult to apply the film cleanly.

To address this, with the application device 1 according to this embodiment, the application mechanism 10 has an application unit 11 for applying from the first end BE1 to the second end BE2 in the first direction on the base material B. Further, the application unit 11, while gripping the film F by the film gripping part 30, presses the film F by moving in the first and second directions relative to the base material B. By this, the film F is pressed onto the base material B along the first direction by the application unit 11, and the film F is applied to the bonding surface BS of the base material B. In other words, while an end portion FE of the film F is gripped by the film gripping part 30, the application unit 11 of the application mechanism 10 can apply the film F from the first end BE1 to the second end BE2 of the base material B. In this way, application of the film can be performed quickly using the application mechanism 10. Therefore, the conventional work for applying the film performed manually by a plurality of people can be semi automated by the application device 1.

Figure 5B:
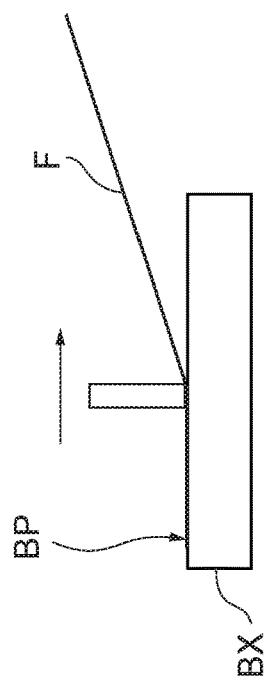
FIGS. 5(a)-5(d) are diagrams schematically illustrating application of the film by an application unit.
Figure 5D:
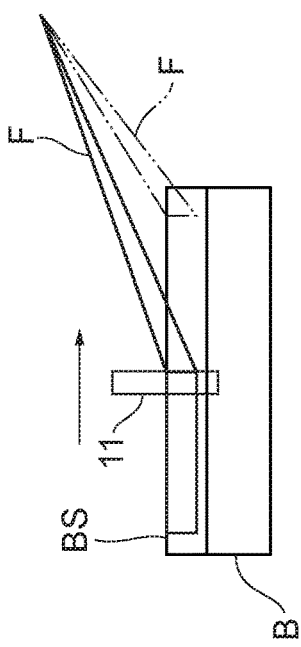
Figure 5A:
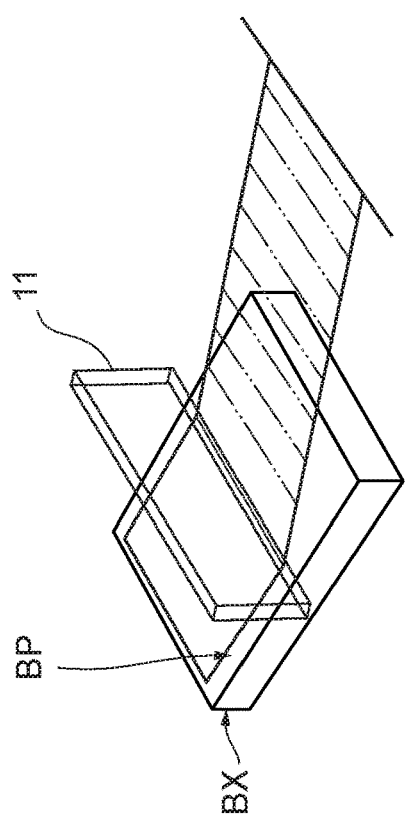

Here, when applying the film F, if the position for gripping the film F by the film gripping part 30 is fixed (if it is constant), the film F may not be able to be cleanly applied. In other words, if the bonding plane BP is, for example, a flat surface such as that of the base material BX illustrated in FIGS. 5A and 5B, when the position of the film gripping part 30 is fixed, the film F is gradually pulled tight (strong tension) in the X-axis direction in accordance with the drive of the application unit 11 in the X-axis direction. By doing this, the film F may not be applied cleanly. Additionally, if the bonding surface BS is, for example, a curved surface (curved shape) such as that of the base material B illustrated in FIG. 5C, in addition to the film F being strongly pulled tight in the X-axis direction in accordance with the drive of the application unit 11 in the X-axis direction, the unapplied portion of the film F may flex in the width direction (FIG. 5D). When attempting to press the film F by the application unit 11 in this state, wrinkles may be generated in the applied film F. Therefore, if the bonding surface BS is a curved surface such as that of the base material B illustrated in FIG. 5C, cleanly applying the film F is even more difficult than when the bonding plane BP is a flat surface such as that of the base material BX illustrated in FIG. 5A.

Figure 5C:
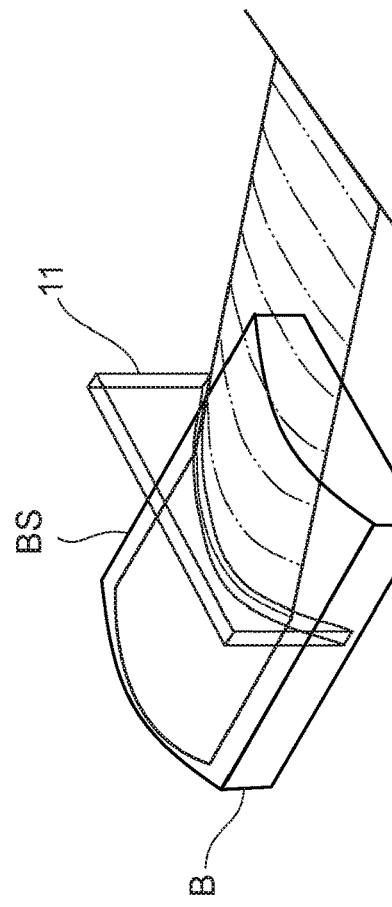

More specifically, with the method shown in FIGS. 5C and 5D, because the position of the gripped portion of the film F is fixed, the angle of the unapplied portion of the film F becomes larger relative to the bonding surface BS as application of the film F advances and the application unit 11 approaches to gripped portion (see film F indicated by the imaginary line in FIG. 5D). With this type of application method, the shape of the intersecting lines of the bonding surface BS and the film F pressed by the application unit 11 (the line where the pressing force by the application unit 11 acts by the linear contact between the application unit 11 and the film F) is not constant but changes according to the drive in the X-axis direction of the application unit 11. This becomes the cause of the flexing of the film F. Therefore, if the shape of the intersecting lines can be held a substantially constant, then the flexing of the film F can be suppressed even if the bonding surface BS is a curved surface. In order to hold the intersecting lines to be substantially constant, the angle formed by the film F relative to the base material B (the film F according to the unapplied portion prior to pressing) is set to an appropriate angle P during pressing of the film F by the application unit 11 and may be held substantially constant at the angle P (see FIG. 4). With the application device 1 according to this embodiment, the film gripping part 30 drives in the Z-axis direction, while the application unit 11 drives in the X-axis direction. Therefore, for example, driving the film gripping part 30 in the Z-axis direction so as to correspond with the drive in the X-axis direction of the application unit 11 enables the angle formed by the film F prior to pressing and the base material B to be the angle P (constant, or substantially constant even if the angle changes) to thereby prevent the flexing in the width direction of the film F. In other words, the film F can be cleanly applied by preventing the generation of wrinkles in the film F. Furthermore, because the film gripping part 30 is driven in the Z-axis direction in conjunction with the drive in the X-axis direction of the application unit 11, tight tension in the X-axis direction by the film F is prevented, and the film F can be cleanly applied. According to the above, the film F can be applied to the bonding surface BS quickly, and quality of the finish can be improved.

Additionally, splitting the application unit 11 into a plurality of split sections 11a, 11b, and 11c along the Y-axis direction facilitates the shape of the application unit 11 to be a shape according to the shape of the base material B making it easier to provide a constant pressing force on the film F by the application unit 11.

Further, the application mechanism 10 can drive each of the plurality of split sections 11a, 11b, and 11c independently in at least one of the first and second directions. By this, even if the base material B has a surface with a curvature on an X-Z plane and/or on a Y-Z plane, because the intersecting lines of the application unit 11 relative to the bonding surface BS and the film F can be maintained to be substantially constant, it is easier for the application unit 11 to form a shape according to the shape of the base material B.

Furthermore, the application device 1 is provided with a tension adjuster 40 that can adjust the tension of the film F, and the tension adjuster 40 is mounted on the film gripping part 30. The gripping force (tension) of the film F by the film gripping part 30 is preferably substantially constant by the gripping members 31a, 31b, and 31c. Therefore, adjusting the tension that grips the film F by the gripping member 31a by the tension adjuster 40 enables the gripping force (tension) of the film F by the film gripping part 30 to be substantially constant.

In addition, the application device 1 is further provided with an extension part 60 provided so as to be continuous with the first end BE1 and the second end BE2 of the base material B. There is a high probability that creases, wrinkles, or the like may occur in the film F after application in the vicinity of the starting point where application begins by the application unit 11 or in the vicinity of the stopping point where the application unit 11 stops, and accordingly, starting and stopping the application in a position of the tension part 60 disposed in a region on the outer side of the base material B suppresses the generation of creases, wrinkles, and the like in the base material B.

Further, in the application device 1, the application unit 11 may be formed in a curved shape so as to be convex from the first end of the base material B to the second end when viewed from the second direction. According to this type of shape, creases, wrinkles, and the like in the film F can be more securely suppressed.

Also, in the application device 1, a length in a third direction of the application unit 11 is longer than a length in the third direction of the base material B. By this, the film can be applied to the entire region in the third direction relative to the base material B by a single application operation by the application unit 11.

Further, in the application device 1, the application unit 11, while pressing the film F, may have a relative movement speed in the first direction relative to the base material B that is variable. By this, an appropriate movement speed can be adjusted according to an applied state of the film F.

Second Embodiment

An application mechanism 100 and 150 of an application device according to a second embodiment will be described with reference to FIG. 6 and FIG. 7. The application mechanism 100 and 150 have adjustment mechanism 110 and 160 that can adjust the angle of the application unit 111 and 161 relative to the base material. When this type of adjustment mechanism 110 and 160 is used, the film F can be applied without generation of creases, wrinkles, and the like even when the bonding surface is a three-dimensional curved surface that curves not only along the second direction but also along the first direction.

Figure 6A:
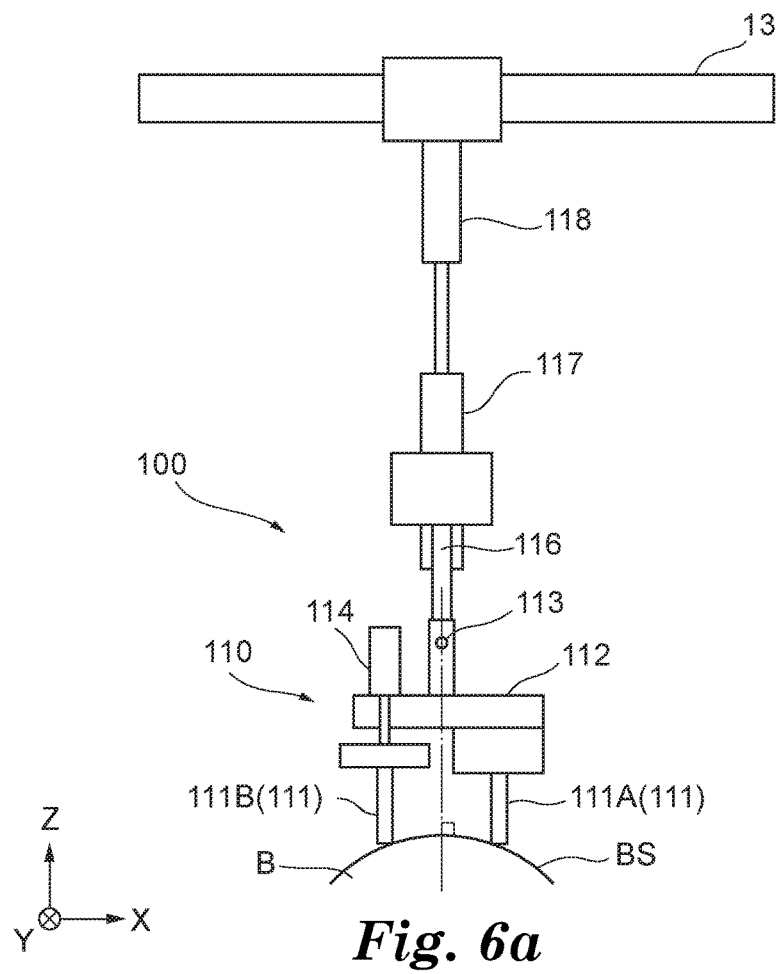
FIG. 6 is a schematic view of an application mechanism according to a second embodiment.

Specifically, as illustrated in FIG. 6, the adjustment mechanism 110 of the application mechanism 100 is provided with a pair of application units 111 (application unit 111A and 111B) that are opposed to each other in the X-axis direction, a support member 112 that supports the application units 111A and 111B, a movable arm 116, and drive units 114 (corresponding to 12b) and 118 (corresponding to 12a) that drive the application unit 111 in the Z-axis direction. For example, an air cylinder can be employed as the drive unit 114, and a single axis robot can be employed as the drive unit 118, but these are not limited thereto as long as they can drive in the Z-axis direction. While the application unit 111A is fixed to the support member 112, the application unit 111B is configured to expand and contract relative to the support member 112 by being applied a driving force from the drive unit 114. The support member 112 is coupled to the bottom end portion of the movable arm 116 via the shaft 113. The support member 112 is coupled so as to allow rotatable movement thereof about the shaft 113

Figure 6B:
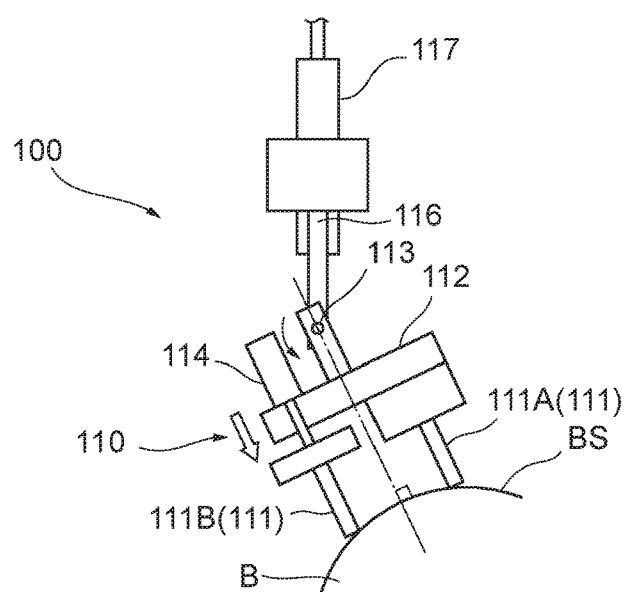

According to the configuration as described above, the adjustment mechanism 110 can adjust an angle relative to the base material of the application units 111A and 111B according to the shape of the bonding surface BS of the base material. Specifically, the adjustment mechanism 110 performs adjustments so that both application units 111A and 111B maintain contact with the bonding surface BS (via the film F). In other words, as illustrated in FIG. 6B, when the shape of the bonding surface BS changes along the X-axis direction, a positional adjustment is made by the drive units 114 and 118 so that the application unit 111A maintains contact with the bonding surface BS. Furthermore, a configuration in which the application units 111A and 111B can expand and contract may also be employed so that the application units 111A and 111B maintain contact with the bonding surface BS by the drive mechanism 117 that drives the application unit 111 in the Z-axis direction. A single axis robot may be employed as the drive unit 117, but the configuration is not limited to this as long as it can drive in the Z-axis direction. Driving the application unit 111 to the Z-axis negative side by the drive unit 118 causes the support member 1122 to rotate about the shaft 113 while the application unit 111A is in contact with the bonding surface BS. At this time, minute adjustments displacing in the Z-axis direction may be made by the drive unit 117 according to the rotation about the shaft 13 by the support member 112. Further, the drive unit 114 performs minute adjustments in the position of the application unit 111B so that the application unit 111B contacts the bonding surface BS. By this, even if the shape of the bonding surface BS changes along the X-axis direction, the incident angle relative to the base material of the application units 111A and 111B can be substantially constant. Making the incident angle of the application units 111A and 111B relative to the base material to be substantially constant in this manner allows the shape of the intersecting lines of the bonding surface BS and the film F pressed by the application units 111A and 111B to be held substantially constant. Note that the drive unit 118 may demonstrate a function of the drive unit 117.

Figure 7A:
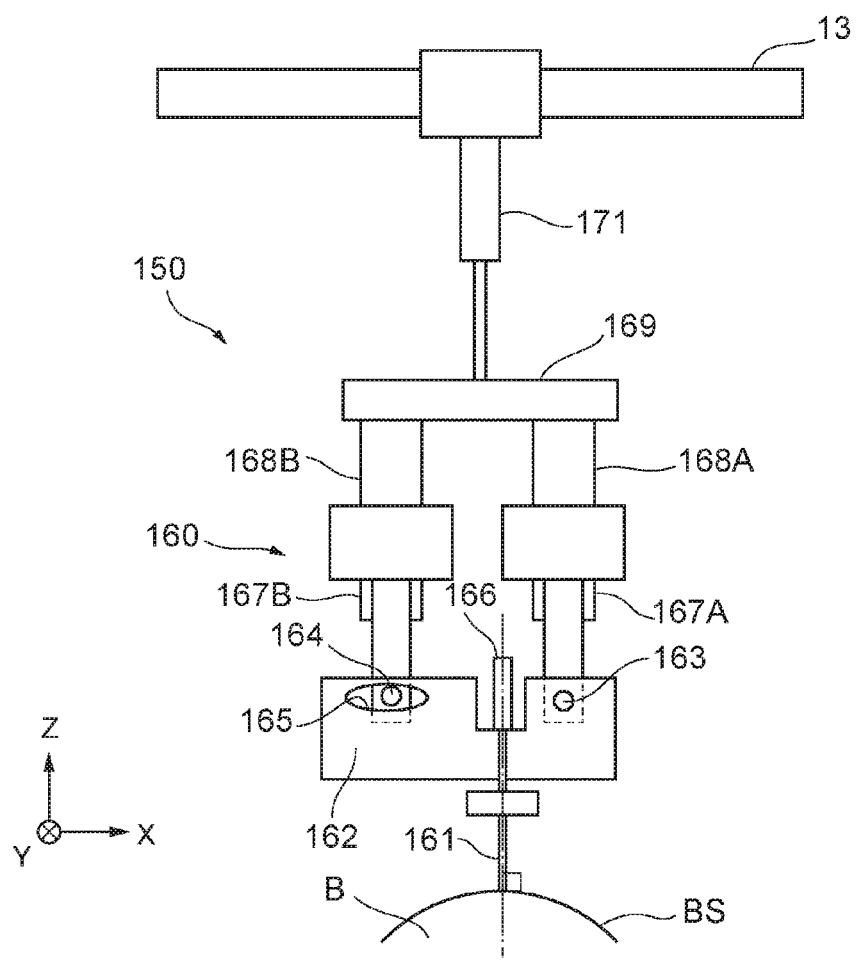
FIGS. 7(a) and 7(b) are schematic views of the application mechanism according to the second embodiment.

Further, as illustrated in FIG. 7, the adjustment mechanism 160 of the application mechanism 150 is provided with an application unit 161, a support member 162 that supports the application unit 161, a drive unit 166 that drives the application unit 161 in the Z-axis direction, movable arms 167A and 167B connected to the support member 162, drive units 168A and 168B that drive the movable arms 167A and 167B in the Z-axis direction, a support member 169 that supports the drive units 168A and 168B, and a drive unit 171 that drives the support member 169 in the Z-axis direction. For example, a single axis robot may be employed as the drive units 168A, 168B, and 171, and an air cylinder may be employed as the drive unit 166, but configurations are not limited to these as long as they can drive in the Z-axis direction. The application unit 161 is configured to be able to expand and contract relative to the support member 162 by a driving force being applied from the drive unit 166. The support member 162 is coupled to the bottom end portion of the movable arm 167A via the shaft 163. The support member 162 is coupled so as to allow rotatable movement thereof about the shaft 163. Further, the support member 162 is coupled to the bottom end portion of the movable arm 167B via the shaft 164. An elongated hole 165 is formed in the support member 162 for the shaft 163 to pass through. The coupling position of the support member 162 and the shaft 164 can be corrected by the elongated hole 165.

Figure 7B:
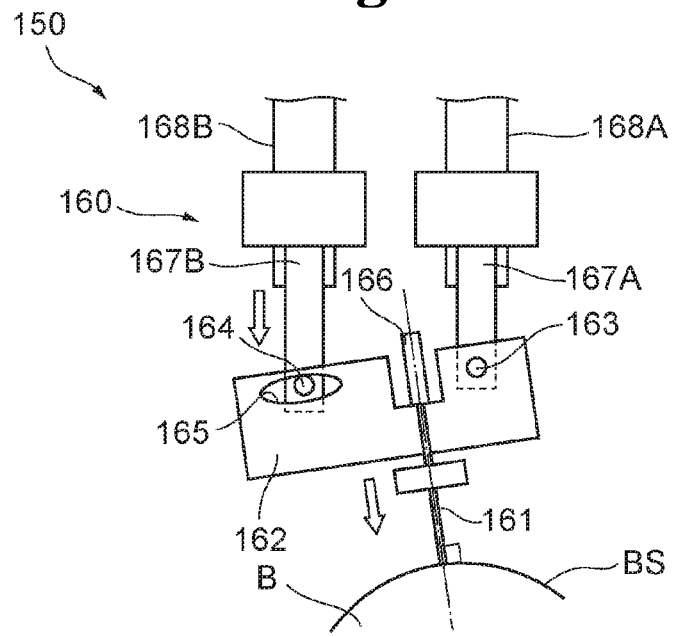

According to the configuration as described above, the adjustment mechanism 160 can adjust an angle relative to the base material of the application unit 160 according to the shape of the bonding surface BS of the base material. Specifically, the drive unit 171 and the drive units 168A and 168B adjust the position of the application unit 161 via the support member 162 by receiving signals from the controller not illustrated. At this time, when there is a difference in the expansion and contraction amounts between the drive unit 168A and the drive unit 168B, the support member 162 rotates about the shaft 163 as illustrated in FIG. 7B. At this time, because the shaft 164 slides along the elongated hole 165, the rotation of the support member 162 is not inhibited. Further, the drive unit 166 performs minute adjustments in the position of the application unit 161 so that the application unit 161 contacts the bonding surface BS. By this, even if the shape of the bonding surface BS changes along the X-axis direction, the shape of the intersecting lines of the bonding surface BS and the film F pressed by the application unit 161 can be held to be substantially constant by making the incident angle relative to the base material of the application unit 161 be substantially constant. Note that, the drive unit 171 may not necessarily be provided, and the drive units 168A and 168B may perform the function of the drive unit 171 by driving further in the Z-axis direction.

Figure 8:
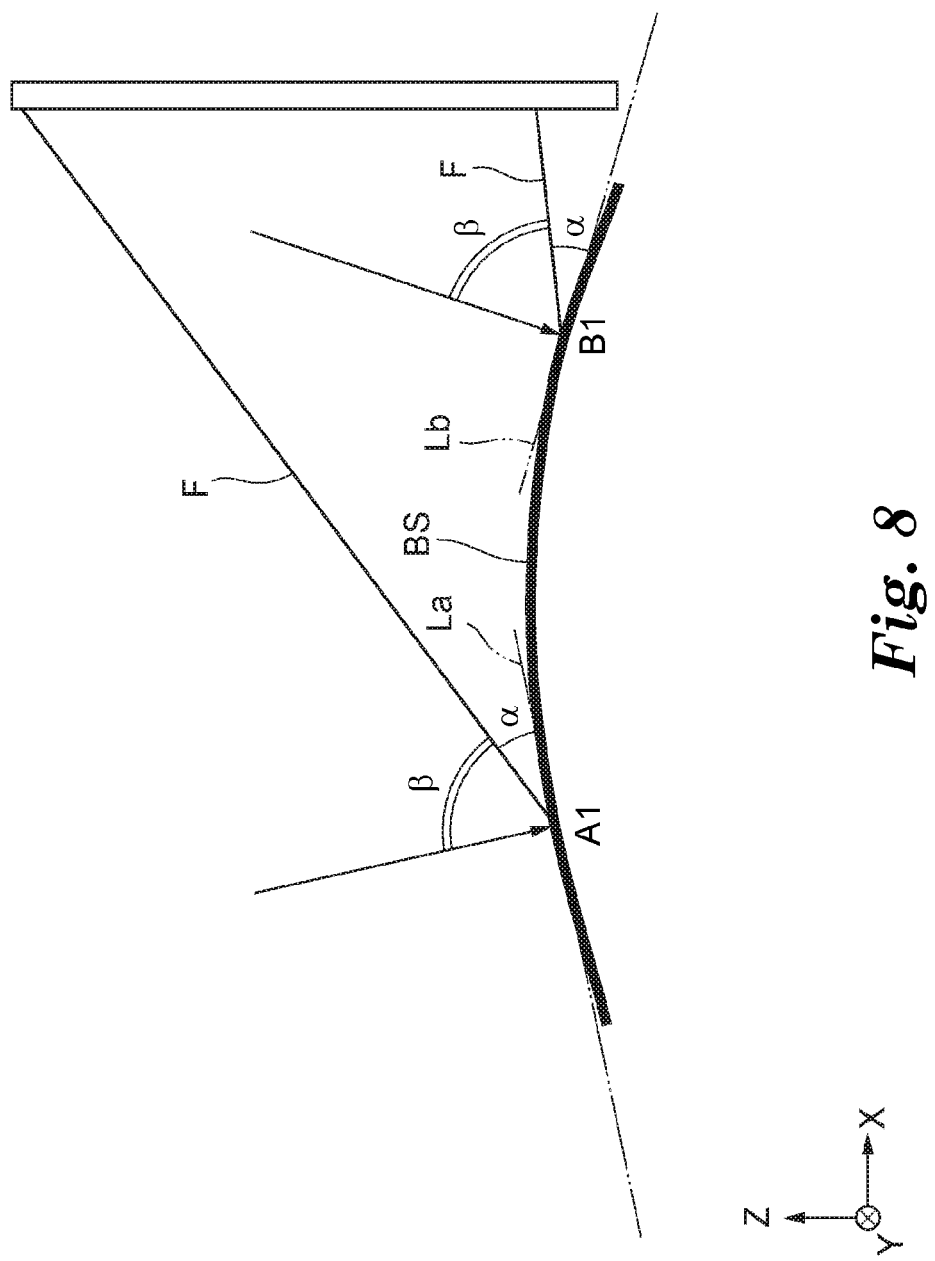
FIG. 8 is a diagram for describing the application mechanism according to the second embodiment.

The angle of the film F and the incident angle of the application unit relative to the bonding surface BS will be described with reference to FIG. 8. As illustrated in FIG. 8, even if the bonding surface BS is curved along the X-axis direction, the angle of the film F for the unapplied portion relative to the base material is preferably substantially constant. In addition, the intersecting lines of the application unit 11 for the bonding surface S and the film F are preferably maintained at a substantial constant. For example, when the film F is applied to the position $A_1$, the angle of the film F for the unapplied portion relative to the tangent La of the position $A_1$ is $\alpha$, and the incident angle of the application unit relative to the film F is $\beta$ (i.e., the incident angle for the tangent La becomes $\alpha+\beta$). If set in this manner, when the film F is applied in the position $B_1$, the angle of the film F for the unapplied portion relative to the tangent Lb of the position $B_1$ is also set to $\alpha$, and the incident angle of the application unit relative to the film F is $\beta$ (i.e., the incident angle for the tangent Lb becomes $\alpha+\beta$).

According to the above, in the application device according to this embodiment, the application mechanism 100 and 150 have an adjustment mechanism 110 and 160 that can adjust the angle of the application units 111A, 111B, and 161 relative to the base material. By this, the shape of the intersecting lines of the bonding surface BS and the film F pressed by the application unit 161 can be held to be substantially constant by making the incident angle relative to the base material of the application unit 161 be substantially constant even for a curved surface in which the bonding surface BS curves not only along the Y-axis direction but that curves along the X-axis direction.

Third Embodiment

Figure 9:
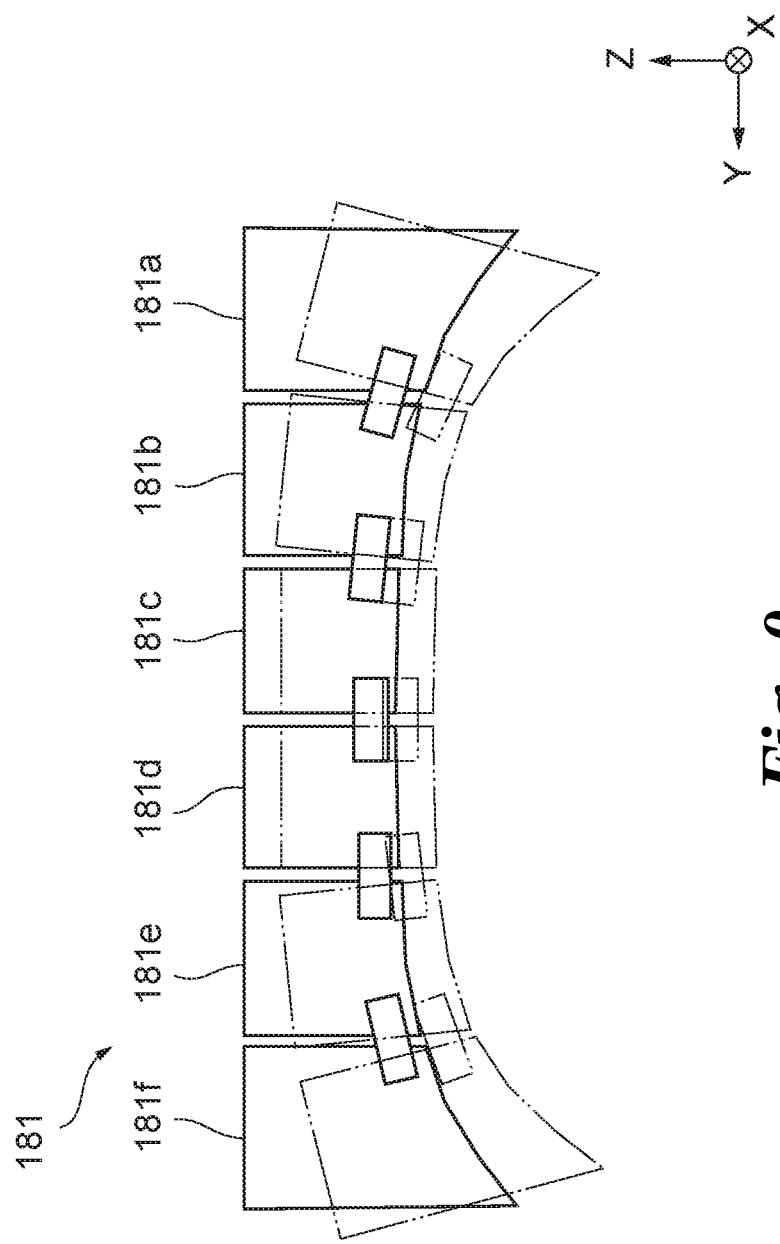
FIG. 9 is a schematic view of an application unit according to a third embodiment.

An application unit 181 of an application device according to a third embodiment will be described with reference to FIG. 9. The application unit 181 is split into, for example, six split sections 181a, 181b, 181c, 181d, 181e, and 181f along the Y-axis direction. Providing a large number of splits, for example six or the like, in the application unit 181 allows for a larger number of independently drivable configurations that makes it easier to correspond to a shape of the base material B (bonding surface BS). In other words, the application unit 181 can be formed into a shape that corresponds to the base material B by independently driving each of the split sections 181a, 181b, 181c, 181d, 181e, and 181f even when the base material B curves in the Y-axis direction such as when there is a large curvature in the curving shape. Moreover, the application unit 181 can be formed into a shape that corresponds to the base material B by independently driving each of the split sections 181a, 181b, 181c, 181d, 181e, and 181f even when the base material B curves in the X-axis direction.

The foregoing has been a detailed description of the present invention with respect to embodiments thereof. However, the present invention is not limited to the above embodiment, and various changes are possible without departing from the gist thereof.

Figure 10A:
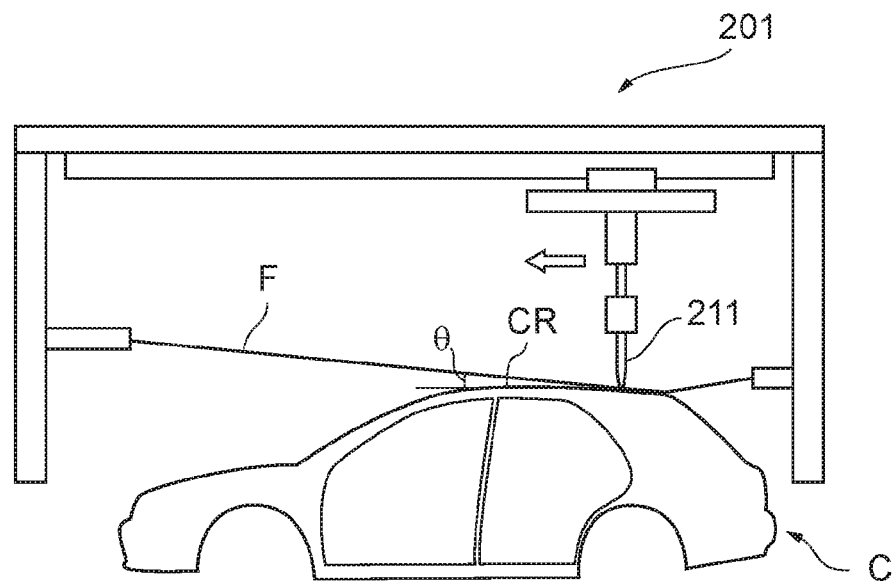
FIGS. 10(a) and 10(b) are schematic views of an application device according to a modified example.
Figure 10B:
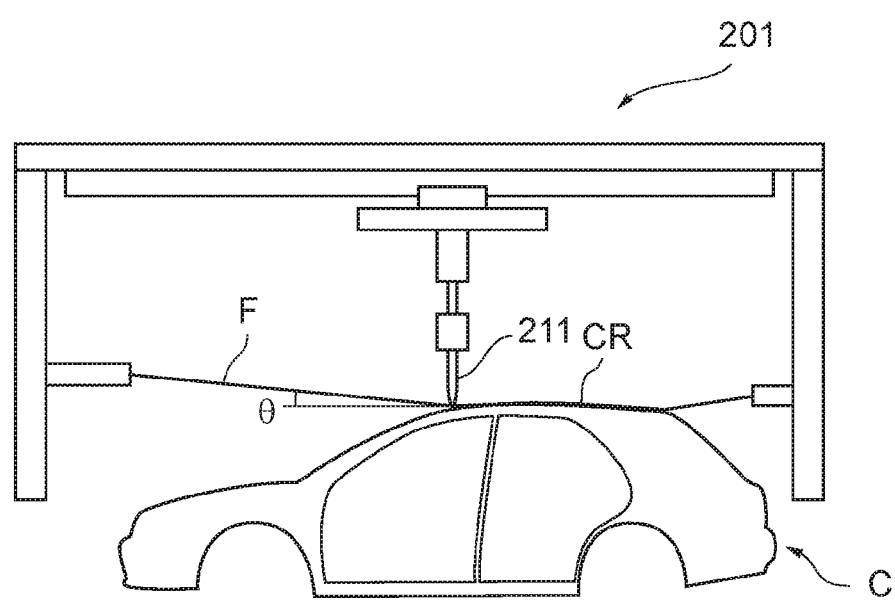

For example, the description provided in the above embodiments were of a film F applied to a base material B placed on a table 41, but the configuration is not limited to this, and as with the application device 201 illustrated in FIG. 10, the application unit 211 may apply the film F to a base material of a size that cannot be placed on a table, for example, a roof portion CR of a vehicle C. Note that, also in this case, the angle formed by the film F prior to pressing and the roof portion CR, which is the base material, preferably forms a substantially constant angle θ from the pressing start time (see FIG. 10A) to the pressing end time (see FIG. 10B). Note that, the vehicle C (roof portion CR) after completion of the application work of the film F corresponds to the "article having a film applied by using the application device" set forth in the claims.

Further, the drive mechanism 13 driving the application unit 11 in the X-axis direction is described, but a configuration in which the application unit moves in the X-axis direction relative to the base material may be employed. In other words, without the application unit driving in the X-axis direction, the application unit may move relative to the base material by driving the base material placed on a belt conveyor or the like in the X-axis direction. Further, the positioning mechanism 12 driving the application unit 11 in the Z-axis direction is described, but a configuration in which the application unit relatively moves in the Z-axis direction relative to the base material may be employed. In other words, without the application unit driving in the Z-axis direction, the application unit may move relative to the base material by driving the base material placed on a lift or the like in the Z-axis direction.

Further, the application unit 11 having a variable drive speed in the X-axis direction while pressing the film F is described, but a relative movement speed of the application unit in the X-axis direction relative to the base material may be variable. In other words, the drive speed in the X-axis direction of the application unit may be constant, and the drive speed of the base material may be variable.

What is claimed is:

1. An application device that applies a film to a base material having a bonding surface, along a first direction which is an extending direction of the base material, comprising:
   an application mechanism having an application unit that applies the film from a first end to a second end in the first direction on the base material by pressing the film wherein the application unit can be driven in both the first direction and a second direction as the film is applied to the base material, the second direction being a direction orthogonal to the first direction and in which the bonding surface and the film are opposed to each other; and
   a film gripping part that grips an end portion of the film on the second end side and that can be driven in the second direction as the application unit presses the film by moving in the first and second directions relative to the base material.

2. The application device according to claim 1, wherein the application unit is split into a plurality of split sections along a third direction that is orthogonal to the first and second directions.

3. The application device according to claim 2, wherein the application mechanism can drive each of the plurality of split sections independently in at least one of the first and second directions.

4. The application device according to claim 1, wherein the application mechanism has an adjustment mechanism that can adjust an angle of the application unit relative to the base material.

5. The application device according to claim 1, further comprising a tension adjuster that can adjust a tension of the film.

6. The application device according to claim 5, wherein the tension adjuster is mounted in the film gripping part.

7. The application device according to claim 4, further comprising a tension adjuster that can adjust a tension of the film.

8. The application device according to claim 1, further comprising an expansion part provided so as to be continuous with the first end and the second end of the base material.

9. The application device according to claim 7, further comprising an expansion part provided so as to be continuous with the first end and the second end of the base material.

10. The application device according to claim 1, wherein the application unit is formed in a curved shape so as to be convex from the first end of the base material to the second end when viewed from the second direction.

11. The application device according to claim 9, wherein the application unit is formed in a curved shape so as to be convex from the first end of the base material to the second end when viewed from the second direction.

12. The application device according to claim 1, wherein a length in a third direction, which is a direction orthogonal to the first and second directions of the application unit, is longer than a length in the third direction of the base material.

13. The application device according to claim 11, wherein a length in a third direction, which is a direction orthogonal to the first and second directions of the application unit, is longer than a length in the third direction of the base material.

14. The application device according to claim 1, wherein when the application unit presses the film, a relative movement speed in the first direction relative to the base material is variable.

15. The application device according to claim 13, wherein when the application unit presses the film, a relative movement speed in the first direction relative to the base material is variable.

* * * * *